United States Patent
Ranjan et al.

(10) Patent No.: US 10,915,349 B2
(45) Date of Patent: Feb. 9, 2021

(54) CONTAINERIZED APPLICATION DEPLOYMENT

(71) Applicant: Hewlett Packard Enterprise Development LP, Houston, TX (US)

(72) Inventors: Jyoti Ranjan, Bangalore Karnataka (IN); Unmesh Gurjar, Bangalore Karnataka (IN); Abhishek Kumar, Bangalore Karnataka (IN); Anudeep Chandra Thatipalli, Bangalore Karnataka (IN); Ajay Kumar Bajaj, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 186 days.

(21) Appl. No.: 15/959,697

(22) Filed: Apr. 23, 2018

(65) Prior Publication Data
US 2019/0324786 A1    Oct. 24, 2019

(51) Int. Cl.
*G06F 9/455* (2018.01)
*G06F 8/60* (2018.01)
*H04L 29/08* (2006.01)

(52) U.S. Cl.
CPC .......... *G06F 9/45558* (2013.01); *G06F 8/60* (2013.01); *G06F 2009/4557* (2013.01); *G06F 2009/45595* (2013.01); *H04L 67/10* (2013.01)

(58) Field of Classification Search
CPC ........ G06F 8/60; G06F 9/4856; G06F 9/5077; G06F 9/45558; G06F 2009/4557; G06F 2009/45595; H04L 67/10
(Continued)

(56) References Cited

U.S. PATENT DOCUMENTS 8,671,404 B2 * 3/2014 DeHaan .................... G06F 8/60
709/223
9,575,797 B2   2/2017 Linton et al.
(Continued)

OTHER PUBLICATIONS

Extended European Search Report received for EP Patent Application No. 19170025.1, dated Sep. 25, 2019, 11 pages.
(Continued)

*Primary Examiner* — Ryan D. Coyer
(74) *Attorney, Agent, or Firm* — Jaffery Watson Mendonsa & Hamilton

(57) ABSTRACT

In some examples, a method includes: (a) reading a manifest file containing information regarding an application running on one or more Virtual Machines (VMs), wherein the information includes application topology, credentials, and configuration details; (b) receiving instructions to re-deploy the application from the one or more VMs to a container environment; (c) discovering, based on information in the manifest file, application consumption attributes including attributes of storage, computer, and network resources consumed by a workload of the application; (d) deploying the application on the container environment to produce a containerized application; (e) copying configuration details from the manifest file to the containerized application; (f) migrating, based on information in the manifest file and the discovered application consumption attributes, stateful data to the containerized application; and (g) validating the containerized application functionality.

20 Claims, 14 Drawing Sheets

(58) Field of Classification Search
USPC ............................................................ 718/1
See application file for complete search history.

(56) References Cited

U.S. PATENT DOCUMENTS

| | | | |
|---|---|---|---|
| 9,594,590 B2 | 3/2017 | Hsu | |
| 9,612,765 B2 | 4/2017 | Huang et al. | |
| 9,990,228 B1* | 6/2018 | Jayanthi | G06F 9/4856 |
| 10,445,086 B2* | 10/2019 | Jozsa | G06F 8/60 |
| 2009/0282401 A1* | 11/2009 | Todorova | G06F 8/61 |
| | | | 717/175 |
| 2013/0091285 A1 | 4/2013 | Devarakonda et al. | |
| 2013/0339941 A1* | 12/2013 | Shelton | G06F 8/658 |
| | | | 717/172 |
| 2014/0181792 A1* | 6/2014 | Fanning | G06F 8/10 |
| | | | 717/124 |
| 2014/0379539 A1* | 12/2014 | Doddavula | G06Q 20/145 |
| | | | 705/34 |
| 2016/0077869 A1* | 3/2016 | Grueneberg | H04L 67/10 |
| | | | 718/1 |
| 2016/0134557 A1 | 5/2016 | Steinder et al. | |
| 2016/0191623 A1 | 6/2016 | Vasudevan et al. | |
| 2016/0330277 A1 | 11/2016 | Jain et al. | |
| 2016/0378525 A1* | 12/2016 | Bjorkengren | G06F 9/45558 |
| | | | 718/1 |
| 2016/0380916 A1 | 12/2016 | Gnaneswaran et al. | |
| 2017/0017505 A1 | 1/2017 | Bijani et al. | |
| 2017/0034016 A1 | 2/2017 | Carroll et al. | |
| 2017/0308330 A1* | 10/2017 | Suresh | G06F 3/0665 |
| 2017/0315795 A1* | 11/2017 | Keller | G06F 9/45558 |
| 2017/0371696 A1 | 12/2017 | Prziborowski et al. | |

OTHER PUBLICATIONS

Lubin, E.; "VM2Docker: Automating the Conversion from Virtual Machine to Docker Container"; Feb. 2015: 68 pages.

Chichin et al., "Smart Cloud Marketplace—Agent-based Platform for Trading Cloud Services", IEEE/WIC/ACM International Joint Conferences on Web Intelligence (WI) and Intelligent Agent Technologies (IAT), 2014, pp. 388-395.

Claus Pahl, "Containerization and the PaaS Cloud," in IEEE Cloud Computing, vol. 2, No. 3, May-Jun. 2015, pp. 24-31.

Sáez et al., "Dynamic Tailoring and Cloud-Based Deployment of Containerized Service Middleware," 2015 IEEE 8th International Conference on Cloud Computing, New York, NY, 2015, pp. 349-356.

Son et al., "Migration scheme based machine learning for QoS in cloud computing: Survey and research challenges", 4th International Conference on Computer Applications and Information Processing Technology (CAIPT), Aug. 8-10, 2017, 4 pages.

Zwischenzugs, "Convert Any Server to a Docker Container," available online at <https://web.archive.org/web/20150706053444/http://zwischenzugs.tk/index.php/2015/05/24/convert-any-server-to-a-docker-container/>, May 24, 2015, 4 pages.

* cited by examiner

CONTAINERIZED APPLICATION DEPLOYMENT

BACKGROUND

Cloud computing has significantly affected the way Information Technology ("IT") infrastructure is being consumed. With the help of virtualization technology, it is possible to deploy workloads using a variety of Virtual Infrastructure ("VI") ranging from public cloud environments to on premise data centers relying on native hardware. New workloads are continuously being created, deployed, and consumed for applications via such virtual infrastructure.

DETAILED DESCRIPTION

Figure 1:
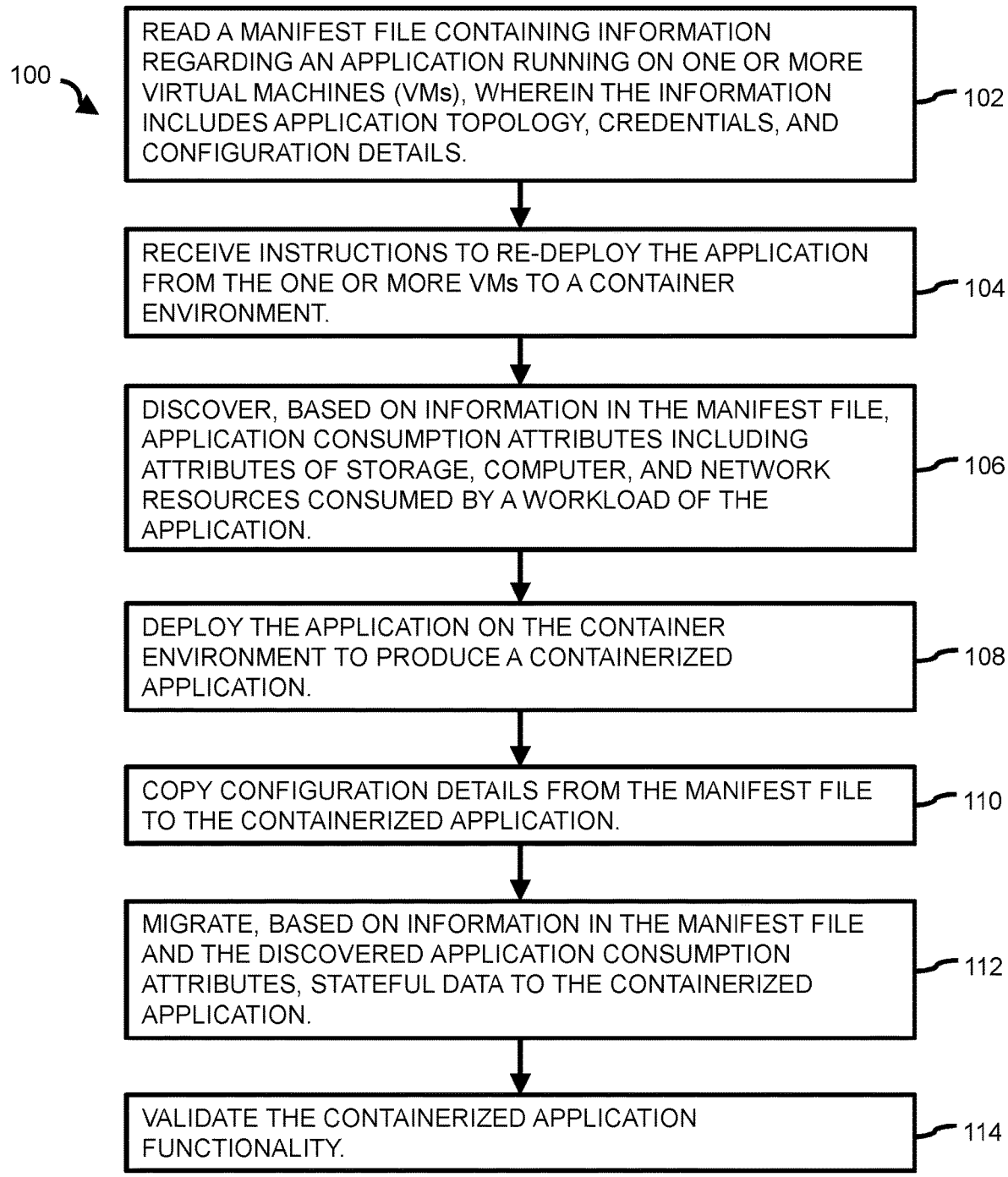
FIG. 1 is a flowchart for a method, according to an example.

The following discussion is directed to various examples of the disclosure. Although one or more of these examples may be preferred, the examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to, the term "including" means including but not limited to. The term "based on" means based at least in part on.

Virtual Machines ("VMs") are a popular mechanism for deploying cloud computing application infrastructure. In some implementations, multiple instances of a VM can share the same physical hardware and each application VM can have its own set of operating system, networking and storage. In some circumstances, it may be preferable to deploy an application workload using virtualized containers rather than VMs. As used herein, the term "containers" can, for example, refer to operating-system-level virtualization in which a kernel or other mechanism allows for multiple isolated user-space instances. Such instances can, for example, be referred to as containers, partitions, virtualization engines ("VEs"), jails, or another suitable term. Such instances can, for example, be designed to look like real computers from the point of view of programs running in them. In comparison to a conventional computer program, which may have visibility of all resources (e.g., connected devices, files and folders, network shares, CPU power, quantifiable hardware capabilities) of the computer running the program, programs running inside a container can be designed to have visibility limited to the container's contents and specific devices assigned to the container. Such containers can, in some implementations, include additional isolation mechanisms that can provide resource-management features to limit the impact of one container's activities on other containers.

In some implementations, containers may provide certain advantages compared to VMs, including reduced overhead, increased flexibility, and improved workload mobility. As a result, although old workloads may be currently running in a VMs, a user may prefer to deploy new instances of already existing applications or new applications itself in containers to take advantage of certain benefits of containerization. It is appreciated that the process of extending applications deployed using VMs with new containers can, in some circumstances, be challenging and cumbersome.

Certain implementations of the present disclosure are directed to an autonomous mechanism to migrate VI for an application from VM to a container eco-system via a multiple cloud ("multi-cloud") management solution. In some implementations, a method can, for example, include: (a) reading a manifest file containing information regarding an application running on one or more VMs, the information including application topology, credentials, and configuration details; (b) receiving instructions to re-deploy the application from the one or more VMs to a container environment; (c) discovering, based on information in the manifest file, application consumption attributes including attributes of storage, computer, and network resources consumed by a workload of the application; (d) deploying the application on the container environment to produce a containerized application; (e) copying configuration details from the manifest file to the containerized application; (f) migrating, based on information in the manifest file and the discovered application consumption attributes, stateful data to the containerized application; and (g) validating the containerized application functionality.

Certain implementations of the present disclosure may enable the conversion of a VM-based deployed VI to a container-based VI in an automated and simplified manner with little to no human intervention. The user of such a system can, in some implementations, take advantage of a hybrid IT environment and choose which cloud is best suited for their newly created VI. Other advantages of implementations presented herein will be apparent upon review of the description and figures.

FIG. 1 depicts a flowchart for an example method 100 related to containerized application deployment. In some implementations, method 100 can be implemented or otherwise executed through the use of executable instructions stored on a memory resource (e.g., the memory resource of the computing device of FIG. 10), executable machine readable instructions stored on a storage medium (e.g., the medium of FIG. 1), in the form of electronic circuitry (e.g., on an Application-Specific Integrated Circuit ("ASIC")), and/or another suitable form. Although the description of method 100 herein primarily refers to operations performed on a server for purposes of illustration, it is appreciated that in some implementations, method 100 can be executed on another suitable computing device. In some implementations, method 100 can be executed on multiple computing devices in parallel (e.g., in a distributed computing fashion).

In some implementations, one or more operations of method 100 can be implemented as a feature in a multi-cloud container and VM platform. In some implementations, the present disclosure can be deployed either as a standalone migration application deployed in a cloud or an extended REST Application Programming Interface ("API") of a cloud management API. The term "REST" as used herein can, for example, refer to a "REpresentational State Transfer" ("REST") architectural style that defines a set of constraints and properties based on HTTP. Web Services that conform to the REST architectural style, or RESTful web services can, for example, provide interoperability between computer systems on the Internet.

Method 100 includes reading (at block 102) a manifest file containing information regarding an application running on one or more VMs. The manifest file information can, for example, include application topology, credentials, and configuration details. Elements of an example manifest file are provided below in the following markup pseudo-code:

```
name: my_db
elements:
  name: mysql
  source_attributes:
    type: vm
    attributes:
      service: //service specific attributes
        port: 3306
        username: xyz
        password: *******
        config_file_path: /var/mysql
      infrastructure:
        instances:
            mysql_1 // set of instances. Based on count, we will
            create a service of as many instances (in this case,
            three)
            mysql_2
            mysql_3
          volumes:
            name: mysql-persistent-storage
            mount_path: /var/lib/mysql
            source: <iscsi.iqn.address> // assumes that it is
iSCSI volume
//////////////////////////////////////////
      destination attributes:
        type: container
        application:
          name: mysql
          image_version: mysql:5.6 // used to search image in docker
hub
        cloud:
          name: aws
          endpoint: <10.1.2.12> // used to create container
          data_migration_mechanism: copy // tells that it will read
          the data blindly from one place and put it at destination
```

Certain implementation of a VM-based application infrastructure can be described, for example, as stateless or stateful. As used herein, the term "stateless application" can, for example, refer to an application, such as a simple notepad application, that uses only configuration data but does not rely on persistent data. For such stateless applications, configuration data can, in some situations, be migrated to allow the application to maintain a same persona when migrated to a container environment. In contrast, as used herein, the term "stateful application" can refer to an application that uses both configuration data and persistent data. Such a stateful application infrastructure can be further categorized based on where persistent data is stored. For example, in some implementations, a stateful application can be in the form of an application that uses an Operating System ("OS") volume to store configuration as well as application data. In some implementations, a stateful application can be in the form of an application that uses an OS volume to store configuration data and an external volume to store application data. Certain implementations of the present disclosure may apply a different migration process based on such different application infrastructure topologies or other factors.

Method 100 includes receiving (at block 104) instructions to re-deploy the application from the one or more VMs to a container environment. It is appreciated that applications deployed using VMs can be diverse in nature and migration workflows may be adapted accordingly. For example, a stateless application may only migrate configuration data while a stateful application may migrate both configuration and application data. Likewise, some applications have specific network topology criteria or other resource-based criteria.

There are a wide variety of container environments, such as Kubernetes™ Mesosphere™ etc., that can be used with the present disclosure. For the sake of example, the present disclosure is focused on migrating a VM workload to container workload managed by a Kubernetes™ environment. Although a specific container environment is described herein, it is appreciated that the methods described herein can be adapted to other suitable container environments which may include similar or additional functionality.

The instructions to re-deploy the application to a container can, in some implementations, be manually input by a user via a Hybrid IT-as-a-Service ("ITaaS") portal and/or via a semi-automated or completed automated process based on one or more relevant factors as described in further detail below. The instructions to re-deploy the application to a container can, for example, include instructions to re-deploy one or more applications to one or more cloud providers. It is appreciated that the instructions may allow a single application to deploy a first set of data (e.g., configuration data) on a first cloud provider and to deploy a second set of data (e.g., application data) on a second cloud provider. Likewise, in some implementations, different applications operating on a system may be deployed on different local container environments. For example, suppose there are 1000 applications running on a given system and the system receives instructions to deploy 600 applications to a local container environment, 300 application to a first public cloud container environment (e.g., Amazon™ Web Service ("AWS") and 100 applications to a second public cloud Microsoft™ Azure™ environment.

As used herein, the term "cloud" can, for example refer to a group of networked elements providing services that are not necessarily individually addressed or managed by users. Instead, an entire provider-managed suite of hardware and software can be thought of as an amorphous "cloud." Cloud computing can, for example, refer to an IT paradigm that enables ubiquitous access to shared pools of configurable system resources and higher-level services that can be rapidly provisioned with minimal management effort, often over the Internet.

The term "private cloud" as used herein can, for example, refer to a cloud in which cloud infrastructure is operated solely for a single organization, whether managed internally or by a third-party, and hosted either internally or externally. The term "public cloud" as used herein can, for example, refer to a cloud in which services are rendered over a network that is open for public use and accessed generally via the Internet. The term "hybrid cloud" as used herein can, for example, refer to a cloud computing service that is composed of some combination of private, public and community cloud services, from different service providers. Varied use cases for hybrid cloud composition exist. For example, an organization may choose to store sensitive client data locally on a private cloud application and infrastructure, but may choose to interconnect that application to a business intelligence application provided on a public cloud as a software service.

In some implementations, method 100 can include the operation of using an aggregate service catalog for searching for application images during migration. Automated discovery of container images for workload can be based on such a catalog service. In some implementations, images can be searched across different repositories, whether it be a Docker™ hub or private repository hub. In such an implementation, the scope of search can be larger than existing solutions and the likelihood of discovering images meeting application criteria is improved.

Method 100 includes discovering (at block 106), based on information in the manifest file, application consumption attributes including attributes of storage, computer, and network resources consumed by a workload of the application. The information discovered at block 106 can, for example, be used for setting parameters to optimally deploy one or more containers based on instantaneous or historical application consumption attributes. In some implementations, block 106 may rely on a crawler which may discovers VM workload topology including infrastructure elements (e.g., compute, storage and network), application configuration details, etc. Such a crawler may also deploy an agent in the workload VM to discover relevant application information for migration. In some implementations, an application data manager may be utilized and may be in the form of a logical component responsible for packaging application data to a newly deployed container-based application. Such an application data manager may also be used to orchestrate quiescing activity for ongoing operation as described further herein.

Method 100 includes deploying (at block 108) the application on the container environment to produce a containerized application. In the example of a Kubernetes container environment, block 108 can, for example, include the operations of creating a set of YAM or ".yam" files representing Kubernetes resources (e.g. POD, Service, PVC, PV, etc.) As provided herein, a container VI can, for example, be automatically created by one or more implementations of the present disclosure based on available information for the identified VM VI for the application. Such an automated container topology deployment can, for example, be based on discovered information from block 106. Such containers can, for example, be created in one or more different cloud service providers (e.g., public, private, hybrid, etc.) based on one or more discovered attributes from block 106. In some implementations, block 108 can include the use of container topology manager. Such a manager may be in the form of a logical component responsible for creating a corresponding container topology and application containers.

In some implementations, such container topology can be in the form of a set of yaml files representing POD, PV, and PVC, etc. for Kubernetes or another suitable managed container eco-system. In some implementations, a topology manager may be used to assist in serving requests to provision a container infrastructure. In some implementations, a container topology creator may be utilized which can create (or translate) VM topology into container topology. In some implementations, a container provision engine may be used to assist in running an application workload. Such a provision engine can, for example, be implemented as a container-based virtual infrastructure. In some implementations, an application lifecycle manager may be used to assist in recycling an old VM workload and bootstrap the container-based application.

Method 100 includes copying (at block 110) configuration details from the manifest file to the containerized application. In some implementations, block 108 of deploying a container environment and block 110 of copying configuration details can be part of a single operations. An example container configuration template is provided below in the following markup pseudo-code:

```
apiVersion: v1
kind: Service
metadata:
    name: mysql
spec:
    ports:
    port: 3306
    selector:
        app: mysql
    clusterIP: None
---
apiVersion: v1
kind: PersistentVolumeClaim
metadata:
    name: mysql-pv-claim
spec:
    accessModes:
        ReadWriteOnce
    resources:
        requests:
            storage: 20Gi
---
apiVersion: apps/v1 // # for versions before 1.9.0 use apps/v1beta2
kind: Deployment
metadata:
    name: mysql
spec:
    selector:
        matchLabels:
            app: mysql
    strategy:
        type: Recreate
    template:
        metadata:
            labels:
                app: mysql
        spec:
            containers:
                image: mysql:5.6
                name: mysql
                env:
                    name: MYSQL_ROOT_PASSWORD
                    value: ****************
                ports:
                    containerPort: 3306
                    name: mysql
                volumeMounts:
                    name: mysql-persistent-storage
                    mountPath: /var/lib/mysql
            volumes:
                name: mysql-persistent-storage
                persistentVolumeClaim:
                    claimName: mysql-pv-claim
```

In some implementations, a configuration data replicator may be used that replicates configuration data so that the newly deployed container-based application has the same configuration as before migration.

Method 100 includes migrating (at block 112), based on information in the manifest file and the discovered application consumption attributes, stateful data to the containerized application. In some implementations, migrating stateful data to the containerized application can, for example, include: (a) determining whether data stored in an OS volume can be accessed by the container environment; (b) migrating data from the OS volume to the destination container environment when it is determined that data stored in the OS volume cannot be accessed by the container environment; and (c) detaching the OS volume from the destination OS volume and attaching the volume to the container environment when it is determined that data stored in the OS volume can be accessed by the container environment.

In some implementations, block 112 can include migrating persistent/stateful data by first copying stateful data stored in OS volume to container host volume. If an external volume is present and can be accessed in the new environment, then detach the volume from VM and attach the same volume to containers. If an external volume cannot be accessed in the new environment, then data present in the external volume may need to be migrated from its source to its destination.

In some implementations, the functionality of method 100 can be tailored to migrate specific but popular workloads (like Wordpress™, MySQL™ Gerrit™, etc.) which has topology of low to medium level of complexity can result in a simplified migration experience compared to certain existing solutions. For more complex topology such as certain multiple-tiered based applications, method 100 can, for example, be used in association with other tools such as a data migrator and may rely on manual administrator intervention or input.

Certain implementations do not just migrate an application running on a VM to a container environment, but additionally moves the application with its state. That is, applications are migrated such that they can run on the container environment as if they were running in their old state on the VM. Certain implementations can be analogized to a mover and packer service that re-plants everything at a destination identical (or substantially identical) to its source. In some implementations, a data manager may be utilized to assist in migrating the persistent and configuration data to the container ecosystem so that the application behaves same as it was when it was deployed in VM ecosystem.

In some implementations, an external volume manager may be used to assist in managing external volumes used to store persistent application data. If the container can access the same volume then the external volume manager may just detach the old volume from the VM and present it to the container. Otherwise, the external volume manager may create a new volume, perform a data migration and present the volume to the container. The module may function as a pass through in situations where there is no external volume presented to the workload. In some implementations, a data replicator for an OS volume may be used to assist in migrating an application's persistent data stored in an OS volume. The module may function as a pass through in situations where there is no persistent data (e.g., for certain stateless applications).

Method 100 includes validating (at block 114) the containerized application functionality. Block 114 can include validating that one or more operations of method 100 were successfully completed. For example, in some implementations, block 114 of method 100 can include validating that stateful data was successfully migrated to the containerized application. In some implementations, block 114 of method 100 can include validating that the containerized application is running as intended by a user beyond. In some implementations, block 114 can include validating functionality via a check sum or other mechanism to indicate successful migration or the like. As provided in further detail herein, method 100 can include one or more additional operations related to such validation, such as restarting the containerized application prior to validation, publishing validation and/or migration status after validation, and/or performing a graceful shutdown of the VM VI following successful validation at block 114. In some implementations, a container migration validator may be used to validate an overall migration status.

It is appreciated that one or more operations of method 100 can be performed periodically. For example, in some implementations, one or more of blocks 102-114 (or other operations described herein) may be performed periodically. In such implementations, the various period times for blocks 102-114 (or other operations described herein) may be the same or different times. In some implementations, one or more of block 102-114 (or other operations described herein) may be non-periodic and may be triggered by some network or other event. For example, in some implementations, block 106 may be triggered by the successful receipt of instructions to re-deploy at block 104.

Although the flowchart of FIG. 1 shows a specific order of performance, it is appreciated that this order may be rearranged into another suitable order, may be executed concurrently or with partial concurrence, or a combination thereof. Likewise, suitable additional and/or comparable steps may be added to method 100 or other methods described herein in order to achieve the same or comparable functionality. In some implementations, one or more steps are omitted. For example, in some implementations, block 114 of validating the functionality of the containerized application can be omitted from method 100 or performed by a different device. It is appreciated that blocks corresponding to additional or alternative functionality of other implementations described herein can be incorporated in method 100. For example, blocks corresponding to the functionality of various aspects of implementations otherwise described herein can be incorporated in method 100 even if such functionality is not explicitly characterized herein as a block in method 100.

FIGS. 2-7 illustrate additional examples of method 100 in accordance with the present disclosure. For illustration, the methods of FIGS. 2-7 reproduce various blocks from method 100 of FIG. 1, however it is appreciated that the methods of FIGS. 2-7 can include additional, alternative, or fewer steps, functionality, etc., than method 100 of FIG. 1 and is not intended to be limited by the flowchart of FIG. 1 (or vice versa) or the related disclosure thereof. It is further appreciated that the methods of FIGS. 2-7 can incorporate one or more aspects of method 100 of FIG. 1 and vice versa. For example, in some implementations, method 100 of FIG. 1 can include the additional operations described below with respect to the methods of FIGS. 2-7.

Figure 2:
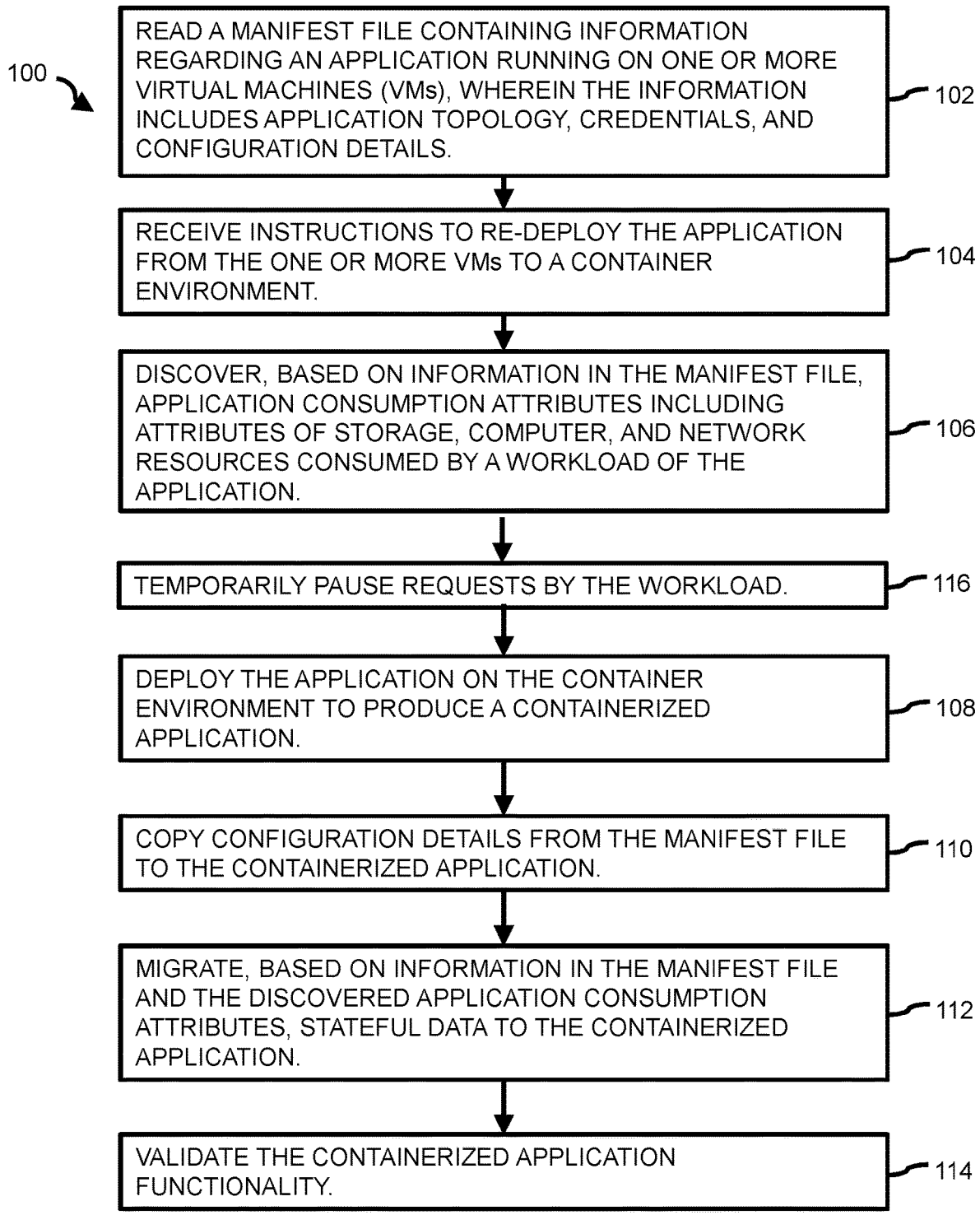
FIG. 2 is a flowchart for a method, according to another example.

Method 100 of FIG. 2 includes temporarily pausing (at block 116) requests by the workload after discovering the application consumption attributes and prior to deploying the application on the container environment. In some implementations, method 100 can quiesce live requests so that old requests are completed and new requests are not taken. In such an implementation, pending user requests may not be affected by the migration process. In some implementations, a quiescer may be used to freeze new requests and allow old requests to be completed prior to migration.

Figure 3:
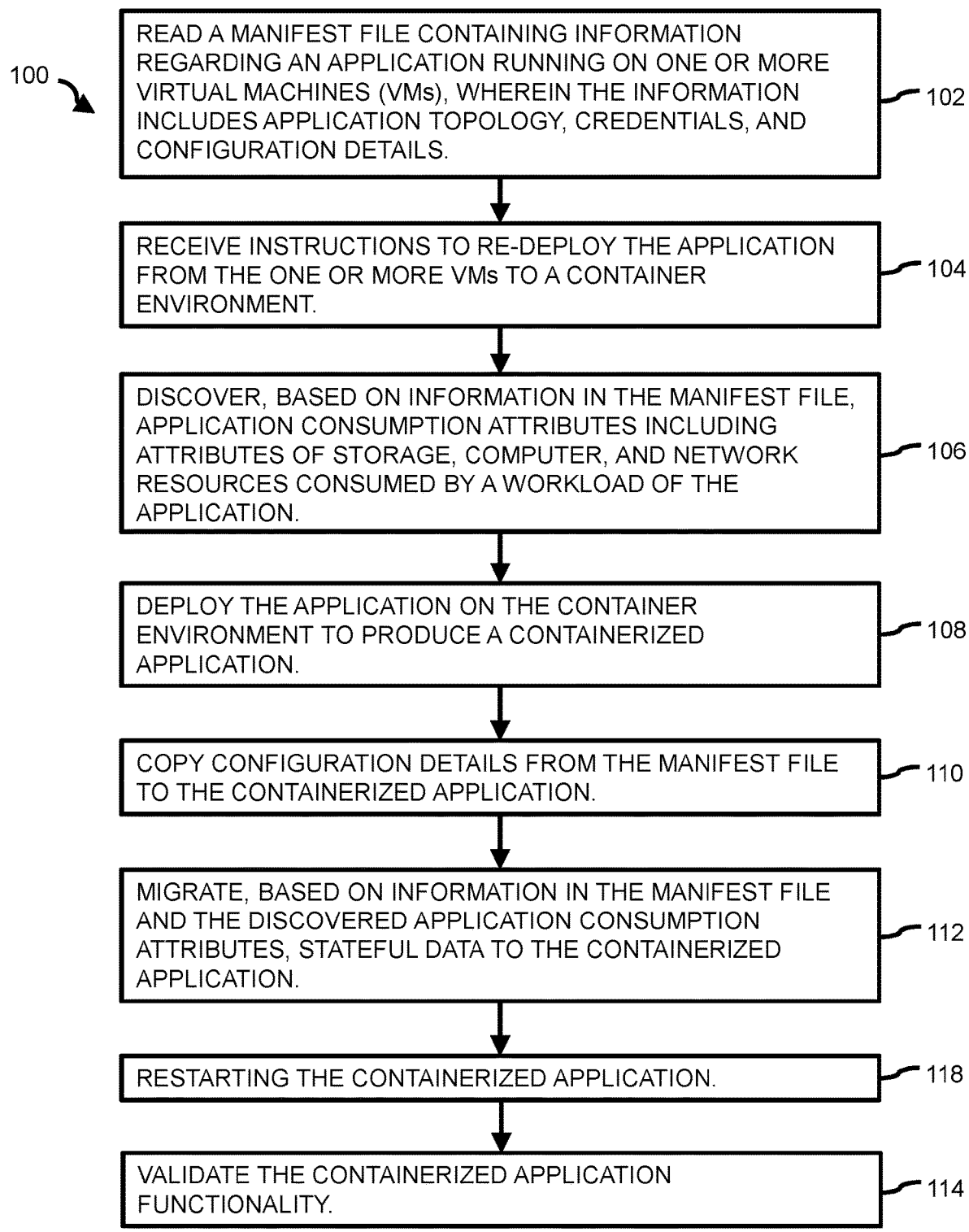
FIG. 3 is a flowchart for a method, according to another example.

Method 100 of FIG. 3 includes restarting (at block 118) the containerized application after migrating the stateful data to the containerized application and prior to validating the containerized application functionality. In such an implementation, method 100 may including restarting the containerized application in order to take effect of a new configuration or for other purposes. In some implementations, an application power cycler may be used to power cycle containers once persistent data migration and configuration data is restored. Such a power cycler may be used to allow applications to take effect of old data used by VM workloads.

Figure 4:
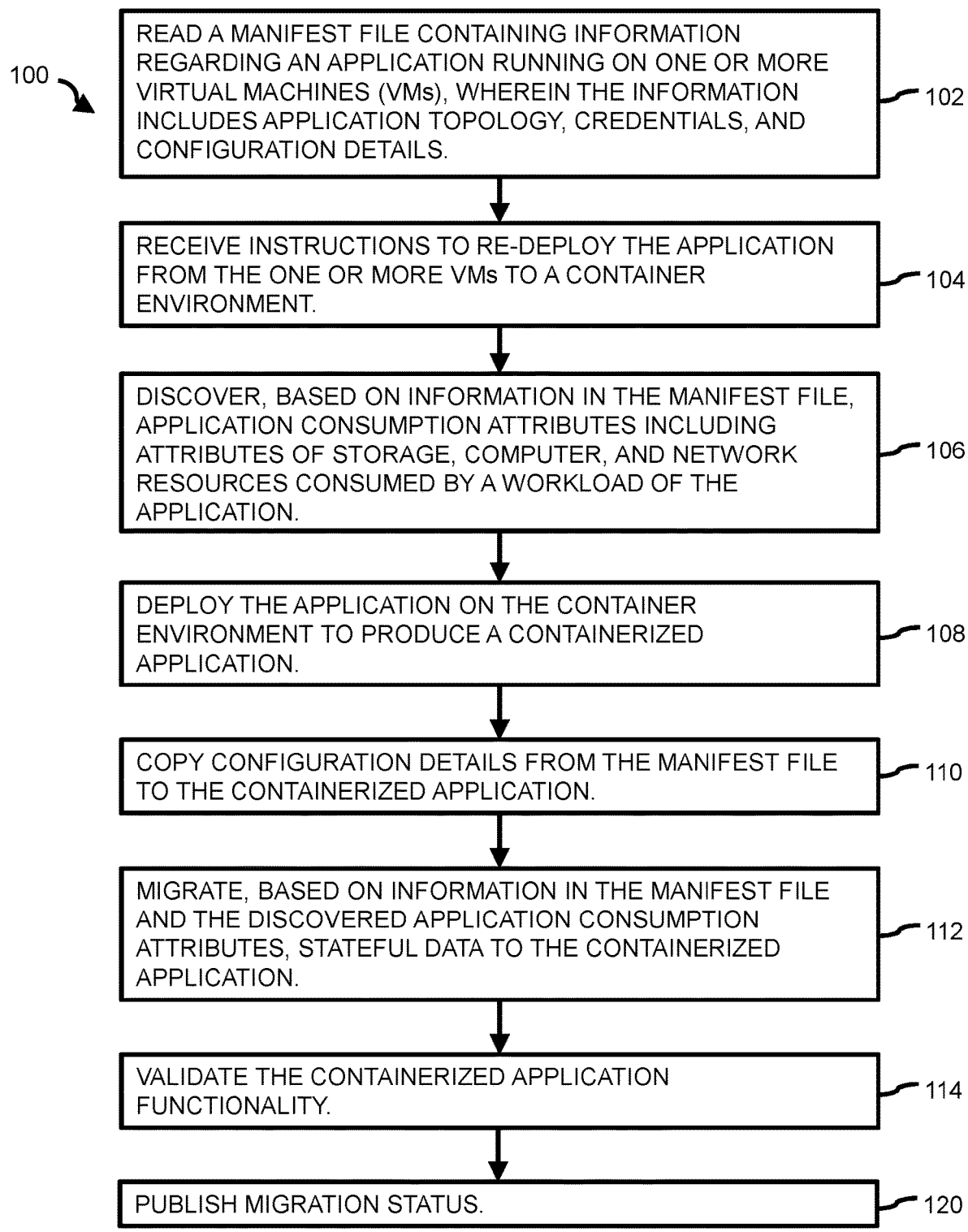
FIG. 4 is a flowchart for a method, according to another example.

Method 100 of FIG. 4 includes publishing (at block 120) migration status after validating the containerized application functionality. In some implementations, block 120 can include publishing migration status to a migration monitor or other service that tracks migration status of the system. In some implementations, migration status may be published only if the migration fails or only if the migration is successful. It is appreciated that any suitable criteria for publishing migration status at block 120 may be manually provided by a network administrator or determined by a system remote or local to the containerized environment.

Figure 5:
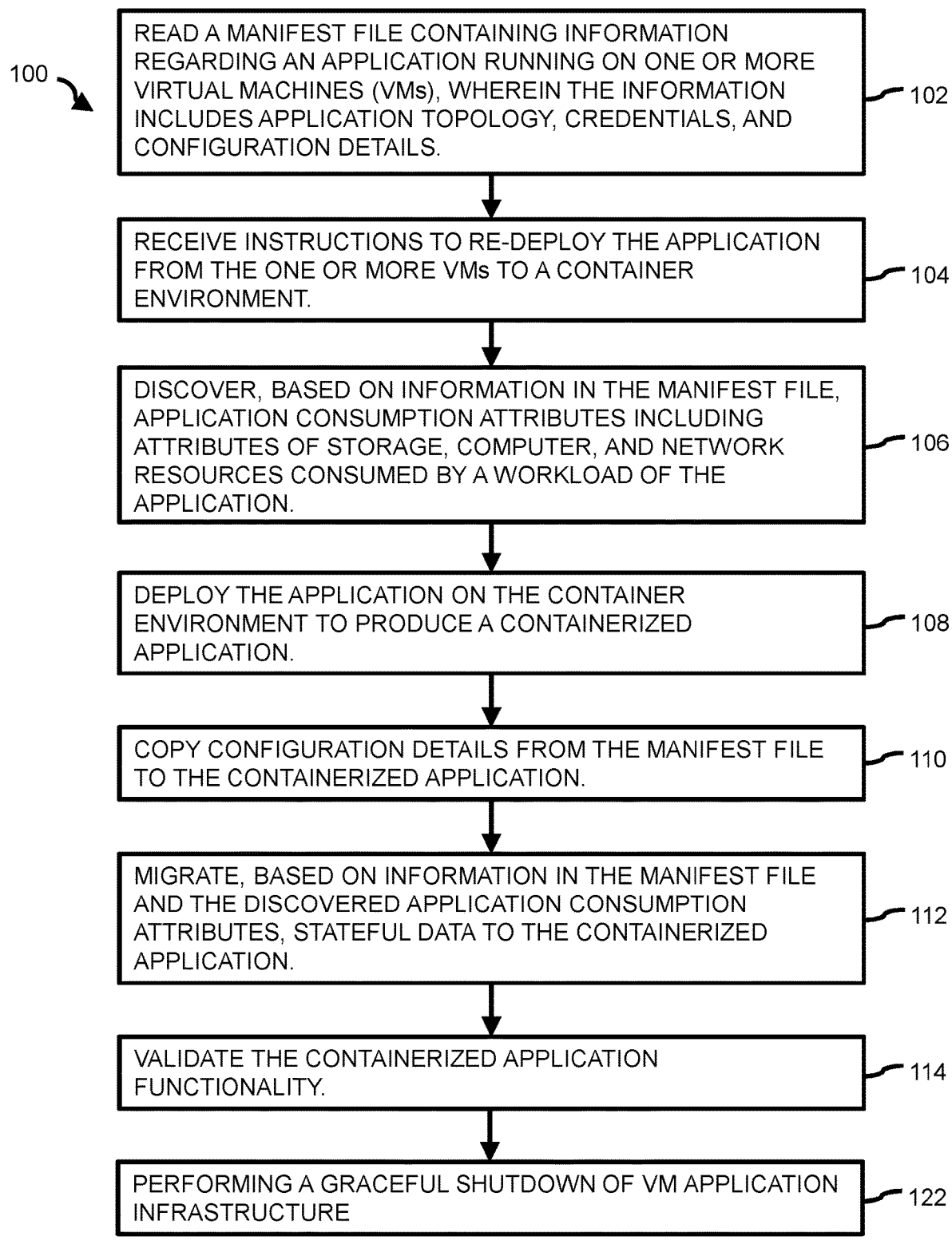
FIG. 5 is a flowchart for a method, according to another example.

Method 100 of FIG. 5 includes performing (at block 122) a graceful shutdown of VM application infrastructure after validating the containerized application functionality. In some implementations, block 122 is in response to receiving instructions from a migration monitor upon successful validation of the containerized application functionality. It is appreciated that in some implementations, the VM application infrastructure is not shut down even upon successful validation of the containerized application functionality. In some implementations, another desired operation may be performed upon successful validation of the containerized application functionality. In some implementations, a VM recycler may be used to delete the VM used to run an application workload.

Figure 6:
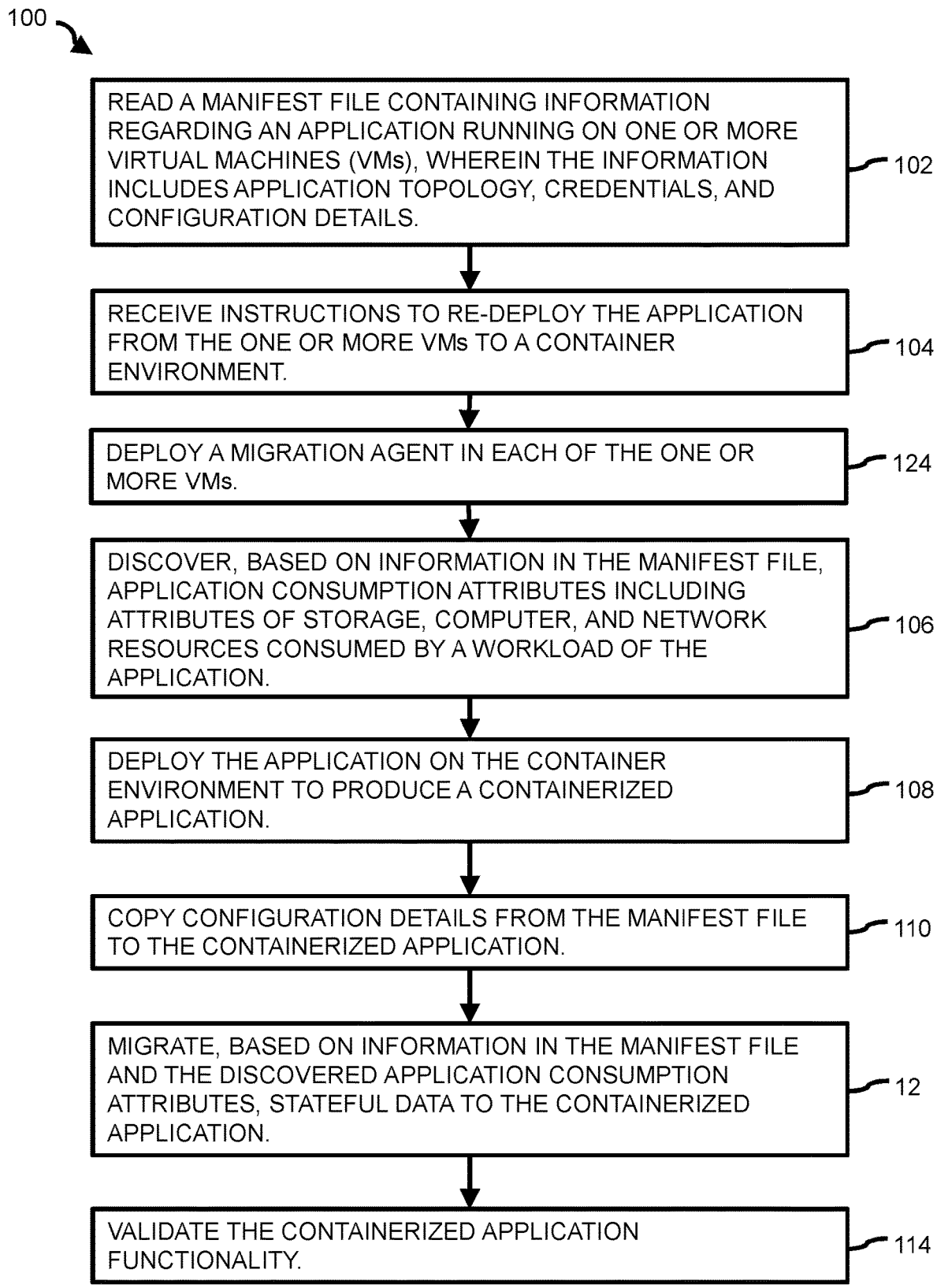
FIG. 6 is a flowchart for a method, according to another example.

Method 100 of FIG. 6 includes deploying (at block 124) a migration agent in each of the one or more VMs after receiving instructions to re-deploy the application and prior to deploying the application on the container environment. The migration agent can, in some implementations, ready data for migration from the VM infrastructure to the container environment. The migration agent can, in some implementations, provide additionality functionality related to method 100 such as the temporary pausing of requests of block 116 or another suitable functionality. In some implementations, block 124 can include the use of a virtual infrastructure mover, which may be in the form of a module responsible for migrating VM-based workloads to a container in a selected cloud. Such a module can, for example, be implemented as a standalone application, a standalone micro-service deployed in a container, an extended multiple cloud platform API to migrate a workload, or another suitable implementation.

Figure 7:
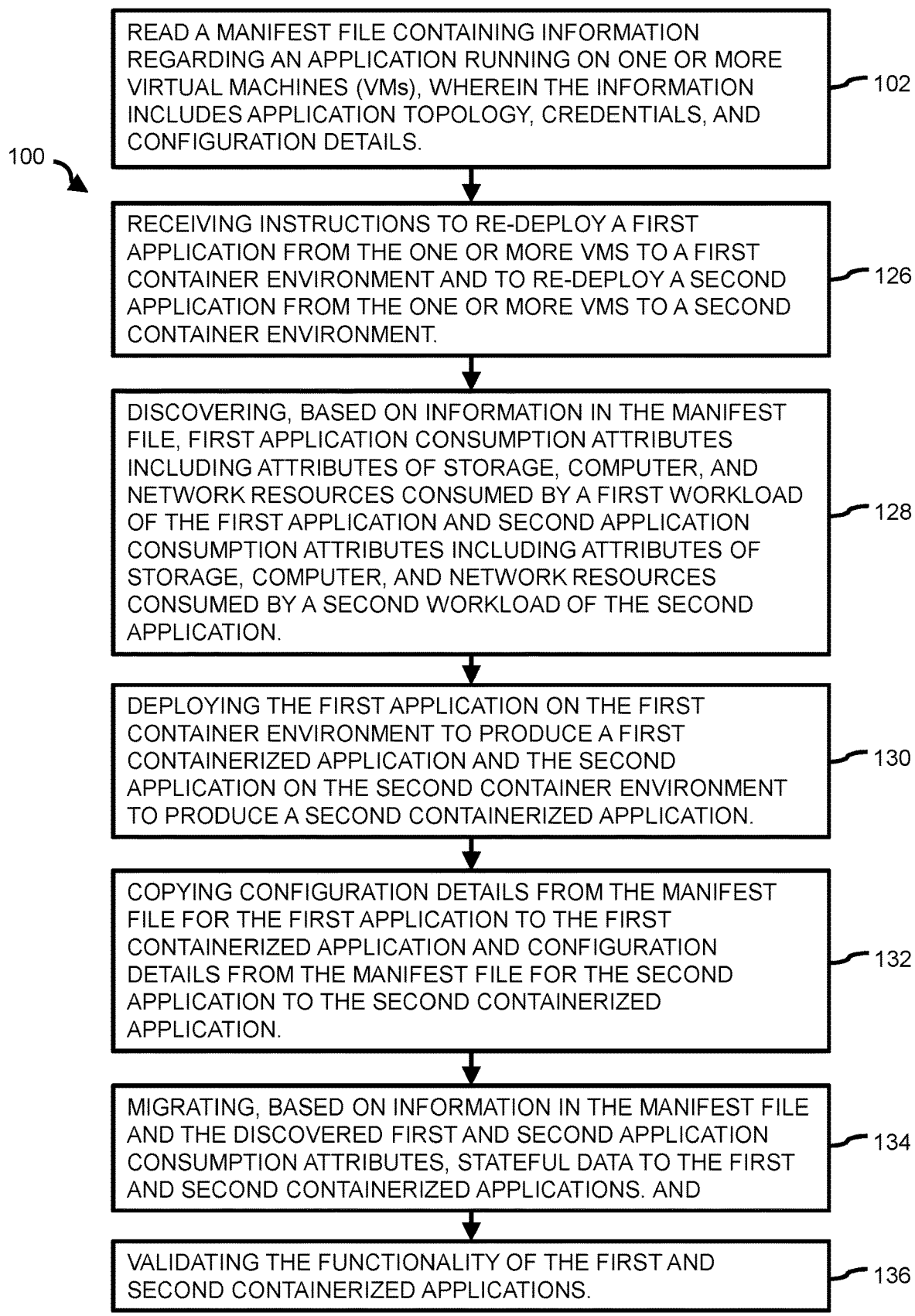
FIG. 7 is a flowchart for a method, according to another example.
Figure 8A:
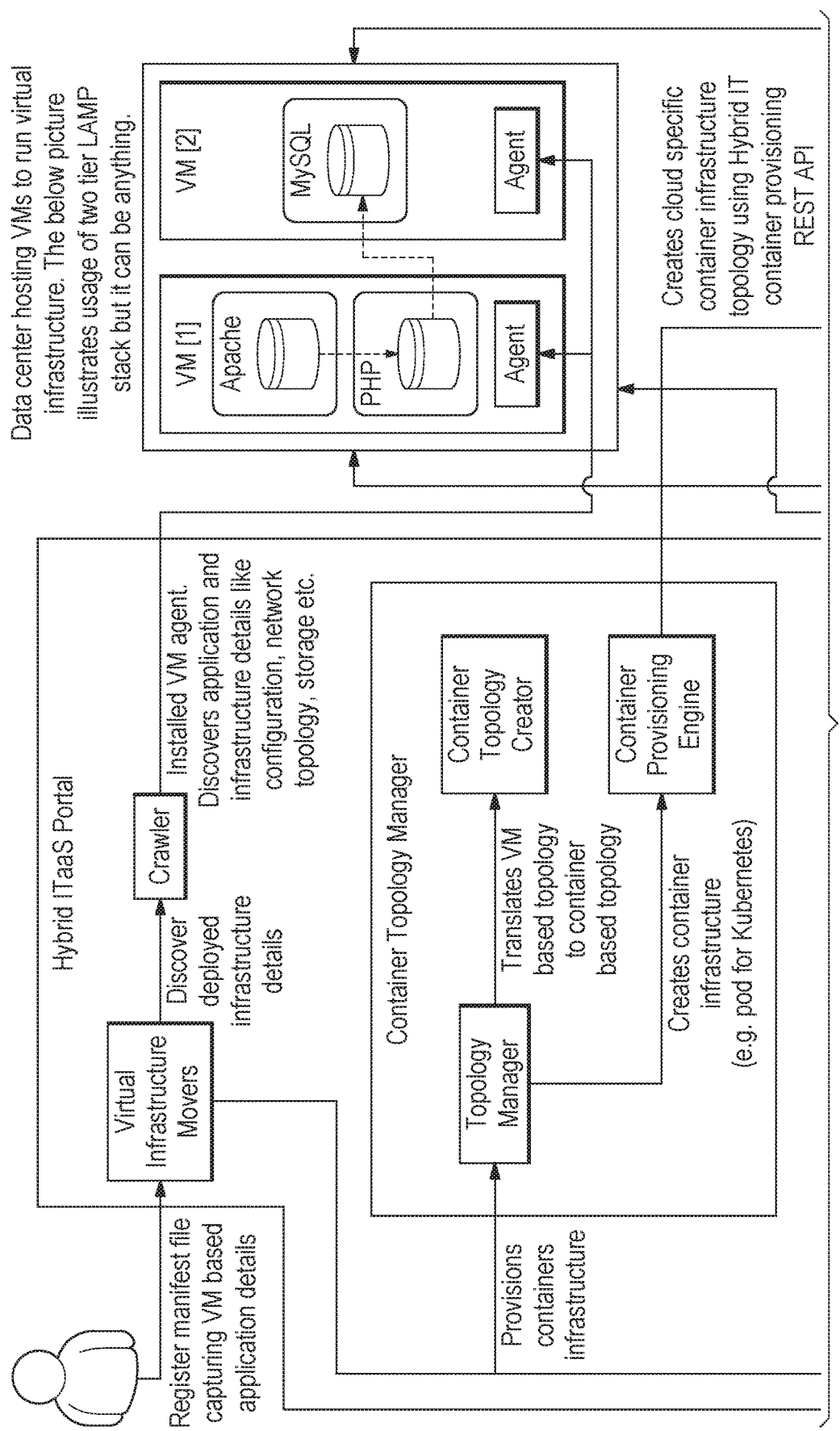
FIGS. 8a, 8b, and 8c combine to make a diagram of a system, according to an example.
Figure 8B:
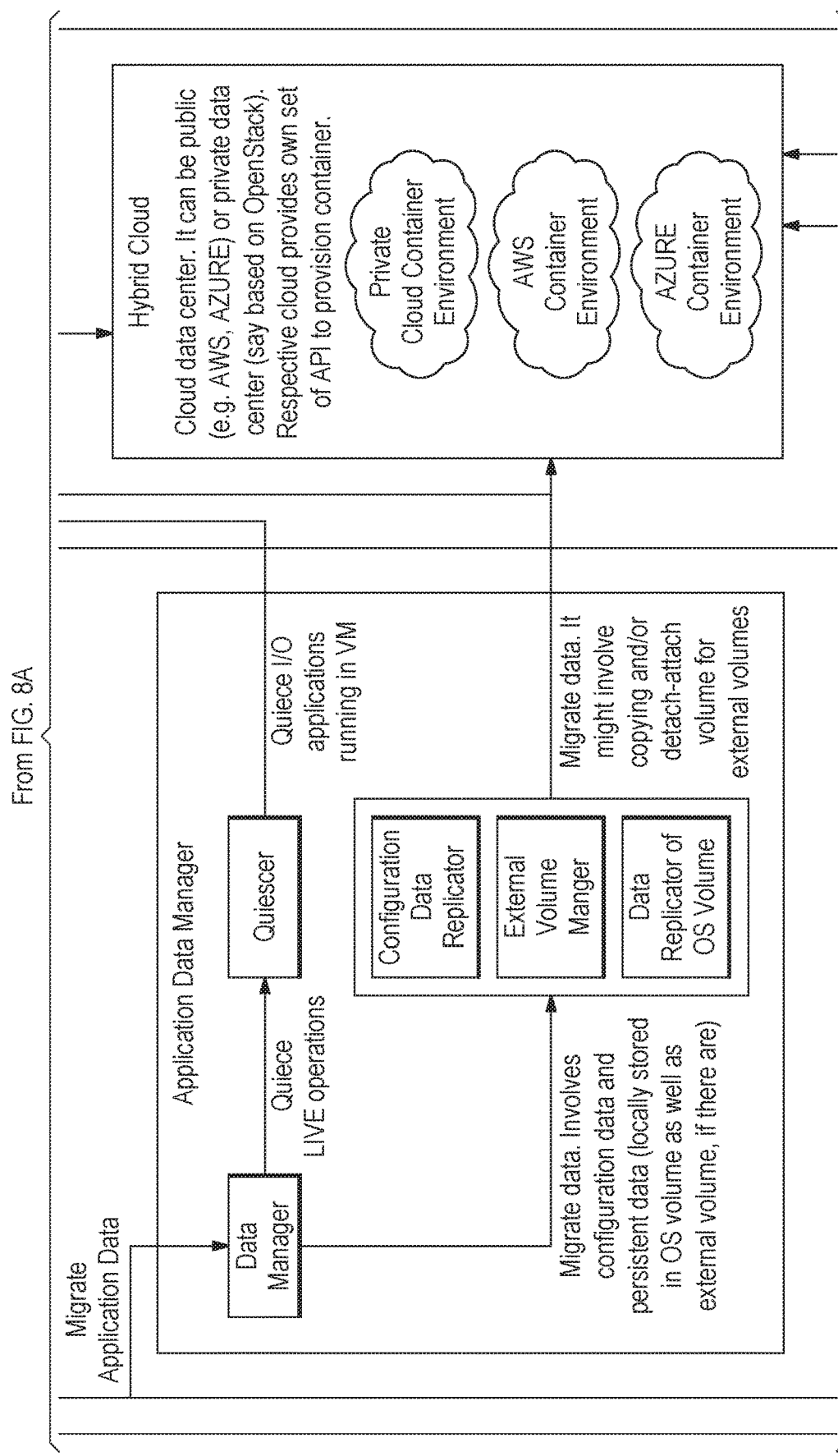
Figure 8C:
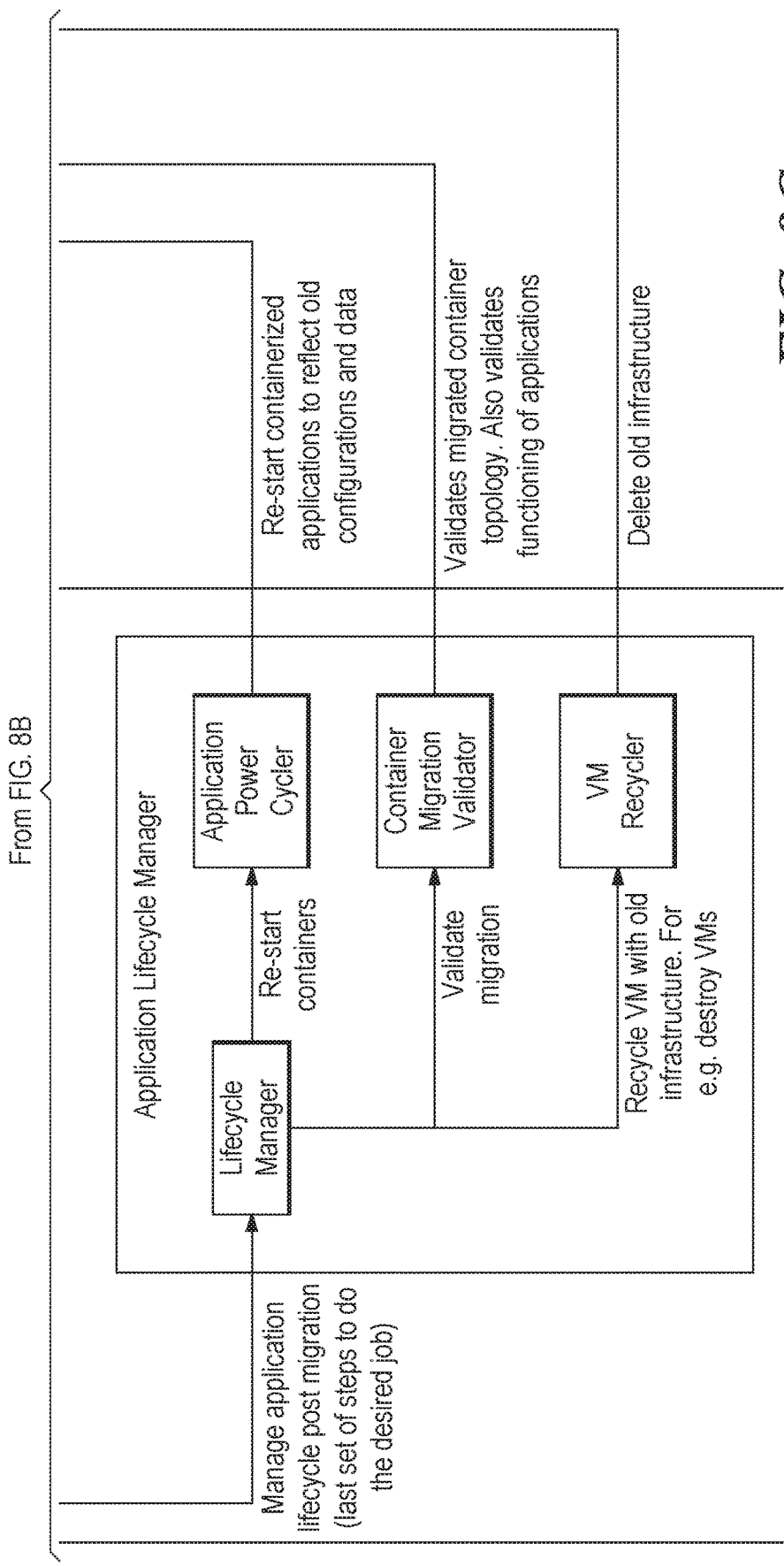
Figure 9A:
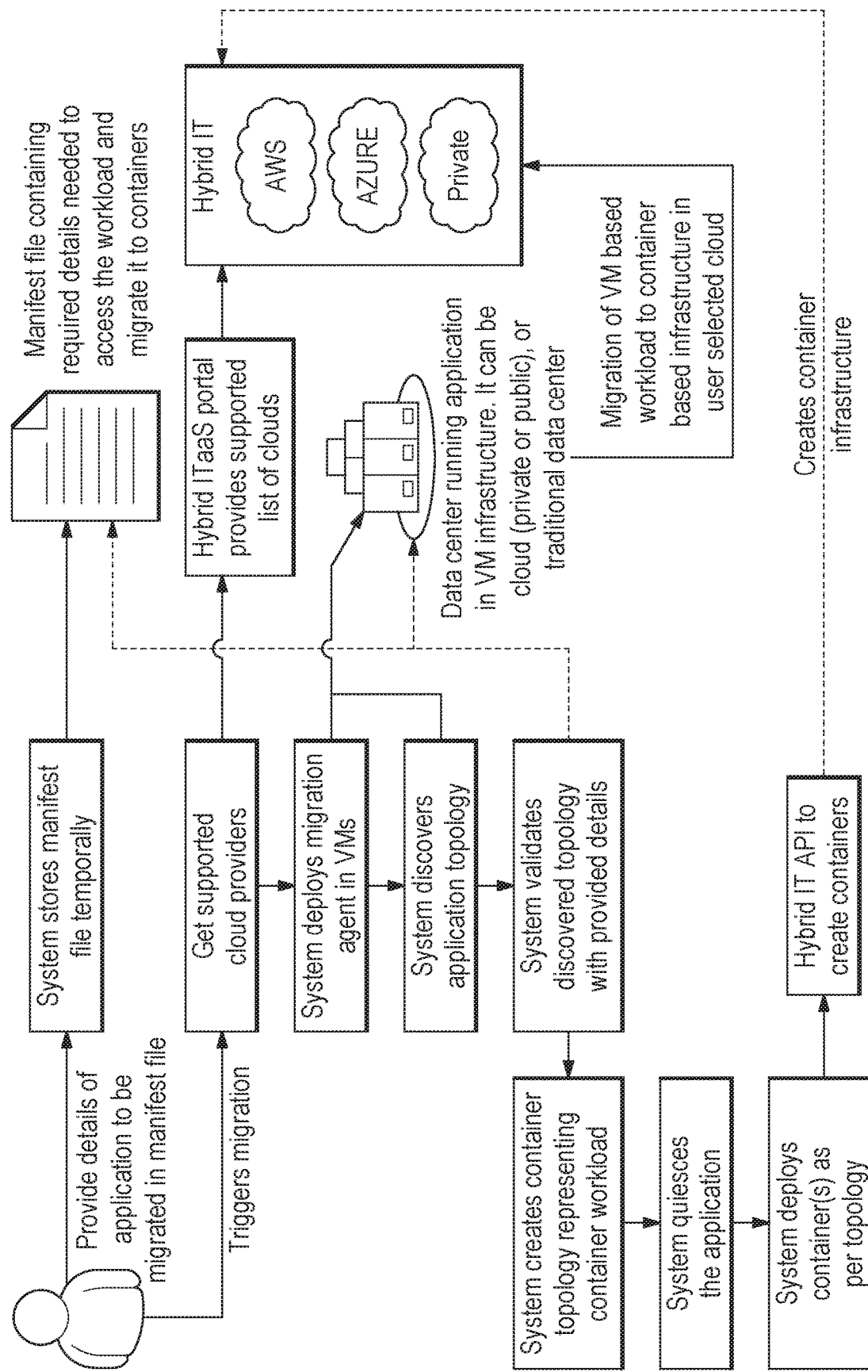
FIGS. 9a and 9b combine to make a diagram and flowchart for a method and system, according to an example.
Figure 9B:
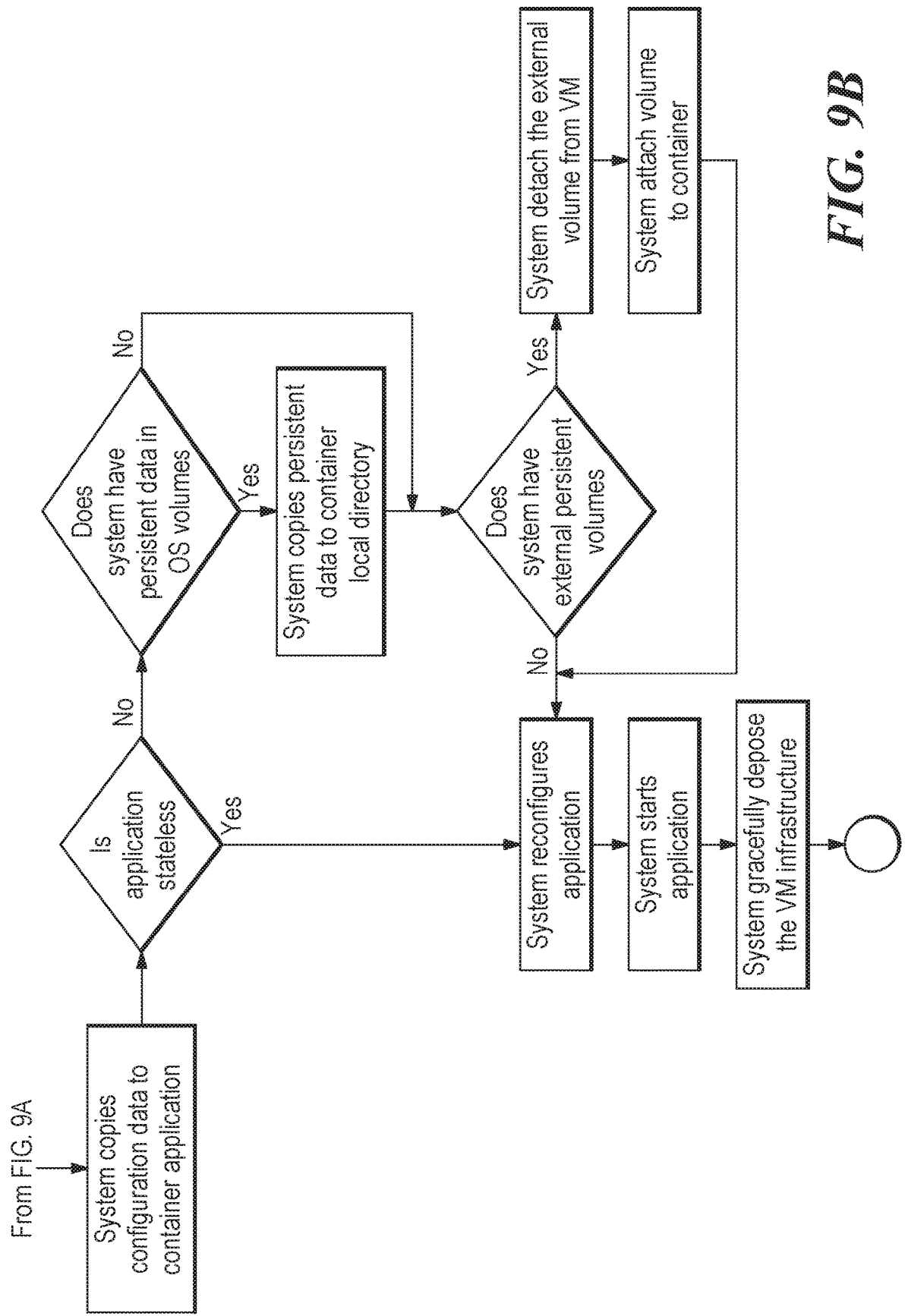

Method 100 of FIG. 7 includes receiving (at block 126) instructions to re-deploy a first application from the one or more VMs to a first container environment and to re-deploy a second application from the one or more VMs to a second container environment. Method 100 of FIG. 7 includes discovering (at block 128), based on information in the manifest file, first application consumption attributes including attributes of storage, computer, and network resources consumed by a first workload of the first application and second application consumption attributes including attributes of storage, computer, and network resources consumed by a second workload of the second application.

Method 100 of FIG. 7 includes deploying (at block 130) the first application on the first container environment to produce a first containerized application and the second application on the second container environment to produce a second containerized application. In some implementations, the first container environment is operated by a first cloud provider and the second container environment is operated by a second cloud provider. In some implementations, the first and second cloud providers are selectable by a user. In some implementations, the first and second cloud providers are selected automatically by the system based on the first and second applications and workloads.

Method 100 of FIG. 7 includes copying (at block 132) configuration details from the manifest file for the first application to the first containerized application and configuration details from the manifest file for the second application to the second containerized application. Method 100 of FIG. 7 includes migrating (at block 134), based on information in the manifest file and the discovered first and second application consumption attributes, stateful data to the first and second containerized applications. Method 100 of FIG. 7 includes validating (at block 136) the functionality of the first and second containerized applications.

Various example implementations for the present disclosure will now be described. It is appreciated that these examples may include or refer to certain aspects of other implementations described herein (and vice-versa), but are not intended to be limiting towards other implementations described herein. Moreover, it is appreciated that certain aspects of these implementations may be applied to other implementations described herein.

FIGS. 8*a*, 8*b*, 8*c*, 9*a* and 9*b* provide relevant diagrams and flow charts for specific examples of the present disclosure and are further described herein. In some implementations, the following operation can be provided:

1. User selects a cloud environment to run a containerized application.
2. The system creates a container ecosystem to deploy container workload (if it is not existing). A multiple cloud management platform can, for example, be used to create a public or private container environment.
3. Discover the application topology deployed using VMs.
4. Create a container template for the application.
5. Deploy containers on the cloud environment.
6. Configure the containerized application to its old state.
7. Quiesce the running application in VM.
8. Migrate data if needed.
9. Delete the VM based virtual infrastructure.
10. Validate functioning of workload.

For a stateless application, the following method may be performed:

1. Receive configuration details from a user in a manifest file
2. In a given hybrid cloud, receive a selection from the user that the application should be migrated to a container environment running in on-premise infrastructure.
3. Receive instructions from a user to begin a migration process.
4. The system deploys the agent VMware VM's running the stateless application.
5. The system discover the application topology. It then validates discovered information with provided details. That may help ensure that no errors occur during migration.
6. The system creates the container environment pod specifications for the stateless application by specifying the application as the container image from a registry. The system stops the application already running on VM.

7. The system deploys the application using the provided pod specifications and performs a graceful shutdown of the application running in the VM architecture.

For a stateful application, the following process may be provided in accordance with the present disclosure. In this example, we can consider a MySQL™ workload deployed as a VM in a VMWare™ environment. We may also consider that a storage volume used to persist MySQL data is accessible to a cloud where the application will be run as a container after migration. This assumption may allow the system to take advantage of a relatively easy data migration path (i.e. to detach persistent volume ("PV") from VMs and present it to container). In situations where this is not the case, then the database may create a new PV, the database may then migrate the data to the PV, and the PV may then be presented to the MySQL container. It is appreciated that additional steps may be performed in such an operation and that the order of operations may be rearranged into another suitable order for the migration task. Given the above circumstances, the system may perform the following steps:

1. The user may provide configuration details for MySQL service in manifest is as follows:

Application topology. Number of instance backed by load balancer, etc.
1. Compute details: 2 CPU cores, 1 GB memory
2. Storage details: 100 GB disk from the external storage.
3. Network details: single network for both management and data.
Service authentication and authorization details like user name, password, etc.
Service configuration details like port number 2. In a given hybrid cloud a user may choose a specific cloud environment such as Kubernetes running in on-premise infrastructure. The user may decide to choose a private cloud, public cloud, or another suitable cloud option.

3. A user may then begin a migration process.

4. The system may then deploy a VM agent running the MySQL workload.

5. The system may then discover application topology. It may then validate discovered information with provided details.

6. Based on the application topology provided the system creates the cloud environment pod specifications for the MySQL application by specifying MySQL as the container image from the registry. Here, the system may take advantage of a multiple cloud catalog service to pick an appropriate registry for the MySQL container workload. The Kubernetes POD specification includes MySQL credentials as environment variables to the pod, volume mounts from external storage and configuration data from host path volume.

7. The system may then stop the MySQL application running on the VM and may unmount the external volumes attached to the VM. After this, the system may prevent new request from being accepted.

8. The system may then copy the configuration data from the VM to Kubernetes nodes to the host path volume location. This can help ensure that MySQL running in the containerized environment is functionally the same as it was in the VM environment.

9. The system may then deploy the MySQL using pod specifications. As part of deployment. It may then present the same volume to the MySQL container service. Once the deployment is done, the system may then validate the service and publish the migration status to a user.

10. The system may then perform a graceful shutdown of MySQL running in the VM infrastructure.

The above example describes a migration operation for a standalone single stateful application (i.e., MySQL). For more complicated applications and topologies, the volume consumed by the VMs may benefit from the following additional operations:

1. Translate into a K8 template.
2. Create a container, which results in the creation of an EBS volume.
3. Copy data from a local volume to the created EBS volume.
4. Restart the MySQL service.

Figure 10:
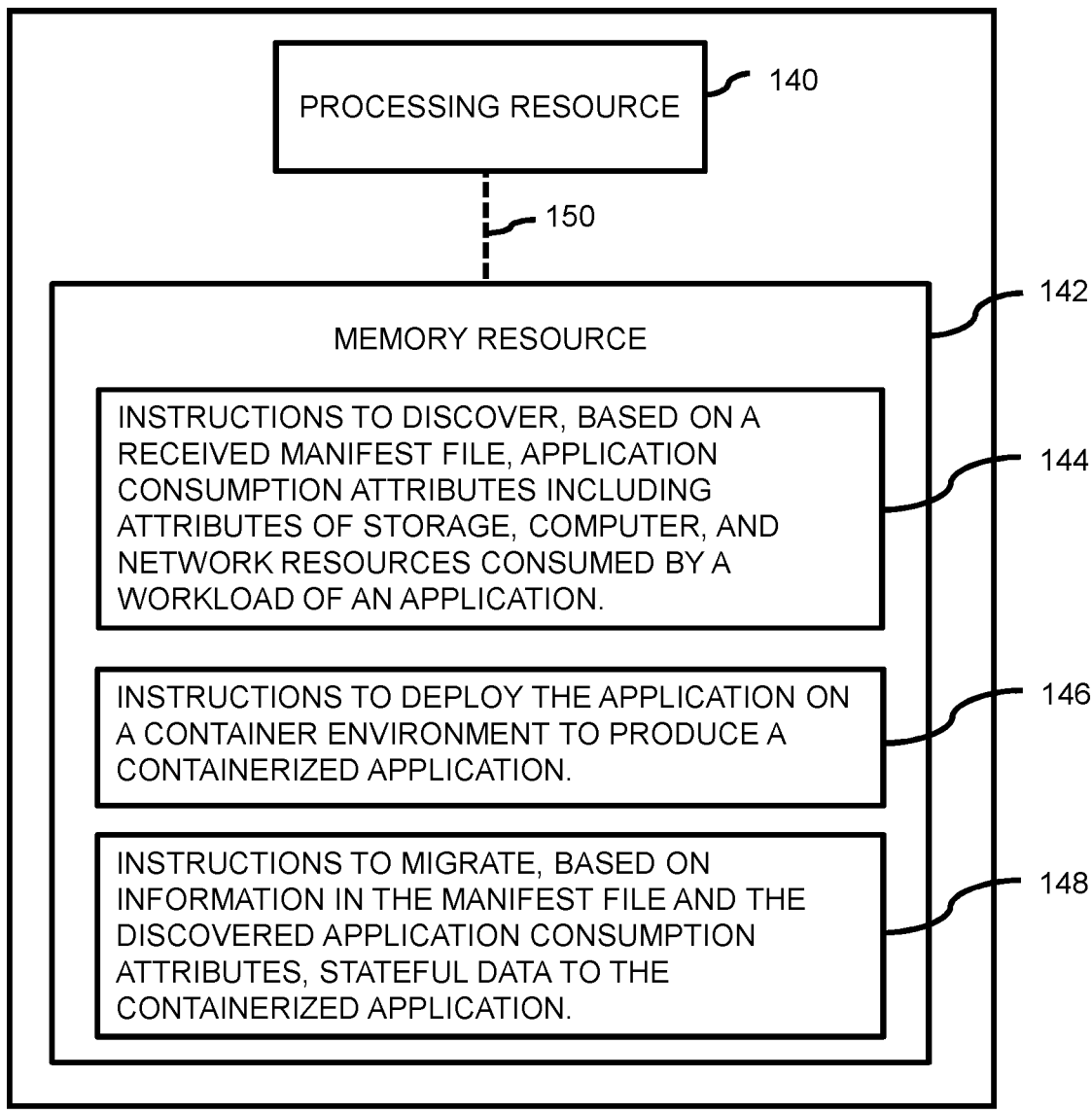
FIG. 10 is a diagram of a computing device, according to an example.

FIG. 10 is a diagram of a computing device 138 in accordance with the present disclosure. Computing device 138 can, for example, be in the form of a server, or another suitable computing device. As described in further detail below, computing device 138 includes a processing resource 140 and a memory resource 142 that stores machine-readable instructions 144, 146, and 148. For illustration, the description of computing device 138 makes reference to other implementations described elsewhere herein. However it is appreciated that computing device 138 can include additional, alternative, or fewer aspects, functionality, etc., than the implementations described elsewhere herein and is not intended to be limited by the related disclosure thereof.

Instructions 144 stored on memory resource 142 are, when executed by processing resource 140, to cause processing resource 140 to discover, based on a received manifest file, application consumption attributes including attributes of storage, computer, and network resources consumed by a workload of an application. Instructions 144 can incorporate one or more aspects of blocks of method 100 or another suitable aspect of other implementations described herein (and vice versa). For example, in some implementations, the manifest file includes information for the application including topology, credentials, and configuration details.

Instructions 146 stored on memory resource 142 are, when executed by processing resource 140, to deploy the application on a container environment to produce a containerized application. Instructions 146 can incorporate one or more aspects of blocks of method 100 or another suitable aspect of other implementations described herein (and vice versa). For example, in some implementations, instructions 146 can be performed by a processor housed within a server or another suitable computing device.

Instructions 148 stored on memory resource 142 are, when executed by processing resource 140, to migrate, based on information in the manifest file and the discovered application consumption attributes, stateful data to the containerized application. Instructions 148 can incorporate one or more aspects of blocks of method 100 or another suitable aspect of other implementations described herein (and vice versa). For example, in some implementations, instructions 146 can be performed by a processor housed within a server or another suitable computing device.

Processing resource 140 of computing device 138 can, for example, be in the form of a central processing unit ("CPU"), a semiconductor-based microprocessor, a digital signal processor ("DSP") such as a digital image processing unit, other hardware devices or processing elements suitable to retrieve and execute instructions stored in memory resource 142, or suitable combinations thereof. Processing resource 140 can, for example, include single or multiple cores on a chip, multiple cores across multiple chips, multiple cores across multiple devices, or suitable combinations thereof. Processing resource 140 can be functional to fetch, decode, and execute instructions as described herein. As an alternative or in addition to retrieving and executing instructions, processing resource 140 can, for example, include at least one integrated circuit ("IC"), other control logic, other electronic circuits, or suitable combination thereof that include a number of electronic components for performing the functionality of instructions stored on memory resource 142. The term "logic" can, in some implementations, be an alternative or additional processing resource to perform a particular action and/or function, etc., described herein, which includes hardware, e.g., various forms of transistor logic, ASICs, etc., as opposed to machine executable instructions, e.g., software firmware, etc., stored in memory and executable by a processor. Processing resource 140 can, for example, be implemented across multiple processing units and instructions may be implemented by different processing units in different areas of computing device 138.

Memory resource 142 of computing device 138 can, for example, be in the form of a non-transitory machine-readable storage medium, such as a suitable electronic, magnetic, optical, or other physical storage apparatus to contain or store information such as machine-readable instructions 144, 146, and 148. Such instructions can be operative to perform one or more functions described herein, such as those described herein with respect to method 100 or other methods described herein. Memory resource 142 can, for example, be housed within the same housing as processing resource 140 for computing device 138, such as within a computing tower case for computing device 138 (in implementations where computing device 138 is housed within a computing tower case). In some implementations, memory resource 142 and processing resource 140 are housed in different housings. As used herein, the term "machine-readable storage medium" can, for example, include Random Access Memory ("RAM"), flash memory, a storage drive (e.g., a hard disk), any type of storage disc (e.g., a Compact Disc Read Only Memory ("CD-ROM"), any other type of compact disc, a DVD, etc.), and the like, or a combination thereof. In some implementations, memory resource 142 can correspond to a memory including a main memory, such as a RAM, where software may reside during runtime, and a secondary memory. The secondary memory can, for example, include a nonvolatile memory where a copy of machine-readable instructions are stored. It is appreciated that both machine-readable instructions as well as related data can be stored on memory mediums and that multiple mediums can be treated as a single medium for purposes of description.

Memory resource 142 can be in communication with processing resource 140 via a communication link 150. Each communication link 150 can be local or remote to a machine (e.g., a computing device) associated with processing resource 140. Examples of a local communication link 150 can include an electronic bus internal to a machine (e.g., a computing device) where memory resource 142 is one of volatile, non-volatile, fixed, and/or removable storage medium in communication with processing resource 140 via the electronic bus.

In some implementations, one or more aspects of computing device 138 can be in the form of functional modules that can, for example, be operative to execute one or more processes of instructions 144, 146, and 148 or other functions described herein relating to other implementations of the disclosure. As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software can include hardware only (i.e., a hardware element with no software elements), software hosted at hardware (e.g., software that is stored at a memory and executed or interpreted at a processor), or hardware and software hosted at hardware. It is further appreciated that the term "module" is additionally intended to refer to one or more modules or a combination of modules. Each module of computing device 138 can, for example, include one or more machine-readable storage mediums and one or more computer processors.

In view of the above, it is appreciated that the various instructions of computing device 138 described above can correspond to separate and/or combined functional modules. For example, instructions 144 can correspond to an "application consumption discovery module." It is further appreciated that a given module can be used for multiple functions. As but one example, in some implementations, a single module can be used to both discover application consumption attributes (e.g., corresponding to the functionality of instructions 144) as well as to deploy an application on a containerized environment (e.g., corresponding to the functionality of instructions 146).

Figure 11:
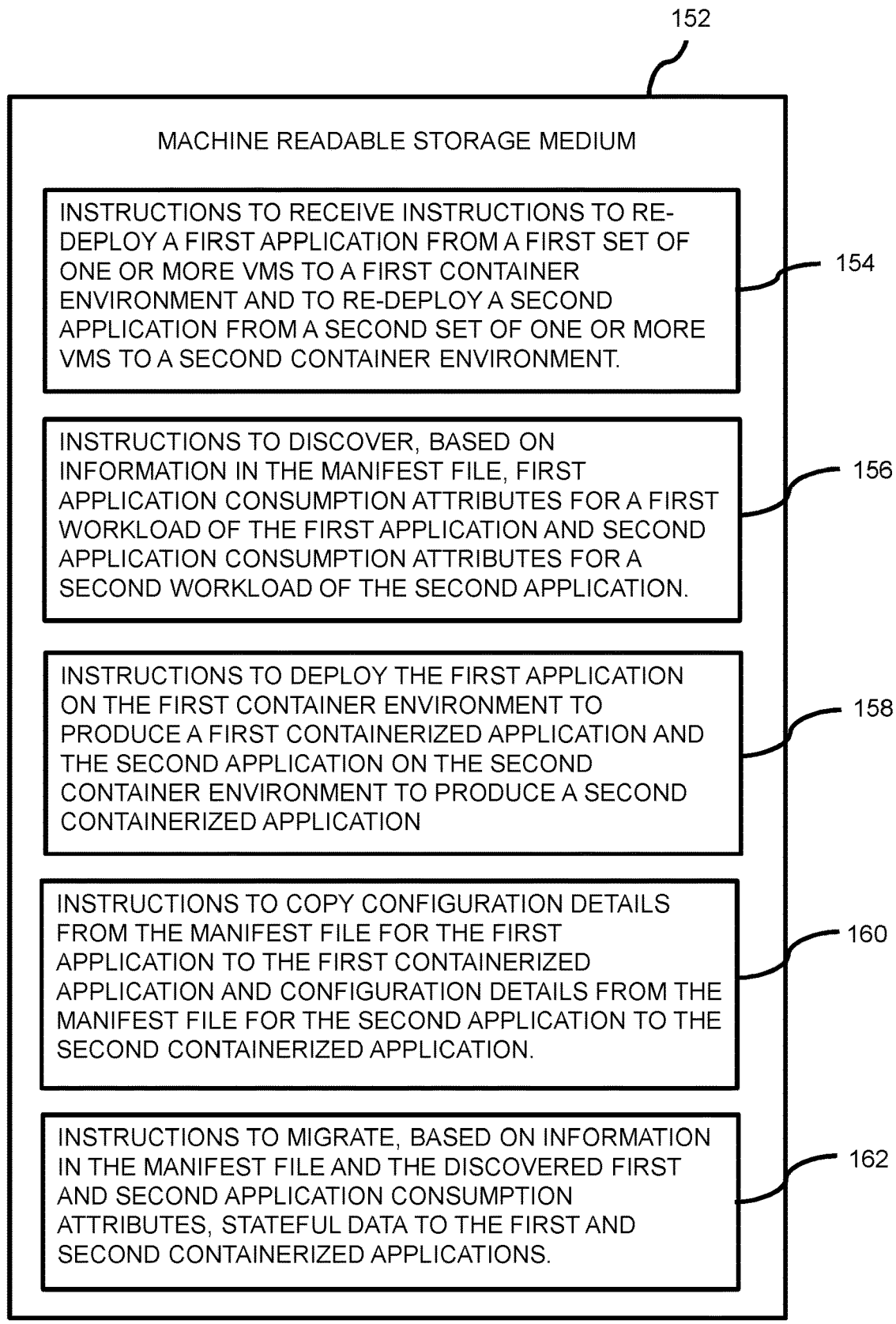
FIG. 11 is a diagram of machine-readable storage medium, according to an example.

FIG. 11 illustrates a machine-readable storage medium 152 including various instructions that can be executed by a computer processor or other processing resource. In some implementations, medium 152 can be housed within a remote or local server. For illustration, the description of machine-readable storage medium 152 provided herein makes reference to various aspects of computing device 138 (e.g., processing resource 140) and other implementations of the disclosure (e.g., method 100). Although one or more aspects of computing device 138 (as well as instructions such as instructions 144, 146, and 148) can be applied to or otherwise incorporated with medium 152, it is appreciated that in some implementations, medium 152 may be stored or housed separately from such a system. For example, in some implementations, medium 152 can be in the form of RAM, flash memory, a storage drive (e.g., a hard disk), any type of storage disc (e.g., a CD-ROM, any other type of compact disc, a DVD, etc.), and the like, or a combination thereof.

Medium 152 includes machine-readable instructions 154 stored thereon to cause processing resource 140 to receive instructions to re-deploy a first application from a first set of one or more VMs to a first container environment and to re-deploy a second application from a second set of one or more VMs to a second container environment. Instructions 154 can, for example, incorporate one or more aspects of block 104 of method 100 or another suitable aspect of other implementations described herein (and vice versa).

Medium 152 includes machine-readable instructions 156 stored thereon to cause processing resource 140 to discover, based on information in the manifest file, first application consumption attributes for a first workload of the first application and second application consumption attributes for a second workload of the second application. Instructions 156 can, for example, incorporate one or more aspects of block 106 of method 100 or another suitable aspect of other implementations described herein (and vice versa). For example, in some implementations, the first and second application consumption attributes include attributes relating to storage, computer, and network resources for the first and second workloads.

Medium 152 includes machine-readable instructions 158 stored thereon to cause processing resource 140 to deploy the first application on the first container environment to produce a first containerized application and the second application on the second container environment to produce a second containerized application. Instructions 158 can, for example, incorporate one or more aspects of block 108 of method 100 or another suitable aspect of other implementations described herein (and vice versa). For example, in some implementations, the first and second application consumption attributes include attributes relating to storage, computer, and network resources for the first and second workloads.

Medium 152 includes machine-readable instructions 160 stored thereon to cause processing resource 140 to copy configuration details from the manifest file for the first application to the first containerized application and configuration details from the manifest file for the second application to the second containerized application. Instructions 160 can, for example, incorporate one or more aspects of block 110 of method 100 or another suitable aspect of other implementations described herein (and vice versa). For example, in some implementations, the first and second application consumption attributes include attributes relating to storage, computer, and network resources for the first and second workloads.

Medium 152 includes machine-readable instructions 162 stored thereon to cause processing resource 140 to migrate, based on information in the manifest file and the discovered first and second application consumption attributes, stateful data to the first and second containerized applications. Instructions 162 can, for example, incorporate one or more aspects of block 112 of method 100 or another suitable aspect of other implementations described herein (and vice versa). For example, in some implementations, the first and second application consumption attributes include attributes relating to storage, computer, and network resources for the first and second workloads.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

As used herein, "logic" is an alternative or additional processing resource to perform a particular action and/or function, etc., described herein, which includes hardware, e.g., various forms of transistor logic, ASICs, etc., as opposed to machine executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

What is claimed is:

1. A method performed by a computing system, the method comprising:
   reading a manifest file containing information regarding an application running on one or more Virtual Machines (VMs), wherein the information includes application topology, credentials, and configuration details;
   receiving instructions to re-deploy the application from the one or more VMs to a container environment;
   discovering, based on information in the manifest file, application consumption attributes including attributes of storage, computer, and network resources consumed by a workload of the application;
   obtaining information regarding a VM workload topology of the one of more VMs discovered by a crawler, wherein the VM workload topology includes infrastructure elements and application configuration details;
   deploying the application on the container environment to produce a containerized application based on the VM workload topology;
   copying configuration details from the manifest file to the containerized application;
   migrating, based on information in the manifest file and the discovered application consumption attributes, stateful data used by the application to the containerized application; and
   validating the containerized application functionality.

2. The method of claim 1, further comprising:
   temporarily pausing requests by the workload after discovering the application consumption attributes and prior to deploying the application on the container environment.

3. The method of claim 1, further comprising:
   restarting the containerized application after migrating the stateful data to the containerized application and prior to validating the containerized application functionality.

4. The method of claim 1, wherein migrating stateful data to the containerized application includes:
   determining whether data stored in an Operating System (OS) volume can be accessed by the container environment;
   migrating data from the OS volume to the destination container environment when it is determined that data stored in the OS volume cannot be accessed by the container environment; and
   detaching the OS volume from the destination OS volume and attaching the volume to the container environment when it is determined that data stored in the OS volume can be accessed by the container environment.

5. The method of claim 1, further comprising:
   publishing migration status after validating the containerized application functionality.

6. The method of claim 1, further comprising:
   performing a graceful shutdown of VM application infrastructure after validating the containerized application functionality.

7. The method of claim 1, further comprising:
   deploying a migration agent in each of the one or more VMs after receiving instructions to re-deploy the application and prior to deploying the application on the container environment.

8. The method of claim 1, further comprising:
   receiving instructions to re-deploy a first application from the one or more VMs to a first container environment and to re-deploy a second application from the one or more VMs to a second container environment;
   discovering, based on information in the manifest file, first application consumption attributes including attributes of storage, computer, and network resources consumed by a first workload of the first application and second application consumption attributes including attributes of storage, computer, and network resources consumed by a second workload of the second application;

deploying the first application on the first container environment to produce a first containerized application and the second application on the second container environment to produce a second containerized application;

copying configuration details from the manifest file for the first application to the first containerized application and configuration details from the manifest file for the second application to the second containerized application;

migrating, based on information in the manifest file and the discovered first and second application consumption attributes, stateful data to the first and second containerized applications; and validating the functionality of the first and second containerized applications.

9. The method of claim 8, wherein the first container environment is operated by a first cloud provider and the second container environment is operated by a second cloud provider.

10. The method of claim 8, wherein the first cloud provider and the second cloud provider are selectable by a user.

11. The method of claim 8, wherein the first cloud provider and the second cloud provider are selected automatically by the system based on the first application and the second application and the first workload and the second workload.

12. A non-transitory machine readable storage medium having stored thereon machine readable instructions to cause a computer processor to:

receive instructions to re-deploy a first application from a first set of one or more VMs to a first container environment and to re-deploy a second application from a second set of one or more VMs to a second container environment;

discover, based on information in a manifest file, first application consumption attributes for a first workload of the first application and second application consumption attributes for a second workload of the second application;

obtain information regarding a first VM workload topology of the first set of one of more VMs discovered by a crawler, wherein the VM workload topology includes first infrastructure elements and first application configuration details;

obtain information regarding a second VM workload topology of the second set of one of more VMs discovered by the crawler, wherein the VM workload topology includes second infrastructure elements and second application configuration details;

deploy the first application on the first container environment to produce a first containerized application based on the first VM workload topology and the second application on the second container environment based on the second VM workload topology to produce a second containerized application;

copy configuration details from the manifest file for the first application to the first containerized application and configuration details from the manifest file for the second application to the second containerized application; and migrate, based on information in the manifest file and the first application consumption attributes and the second application consumption attributes, stateful data used by the first application and the second application to the first containerized application and the second containerized application, respectively.

13. The medium of claim 12, wherein the first application consumption attributes and the second application consumption attributes include attributes relating to storage, computer, and network resources for the first workload and the second workload, respectively.

14. A computer system comprising:

a processing resource; and a memory resource storing machine readable instructions to cause the processing resource to:

discover, based on a received manifest file, application consumption attributes including attributes of storage, computer, and network resources consumed by a workload of an application running on a Virtual Machine (VM);

obtain information regarding a VM workload topology of the VM discovered by a crawler, wherein the VM workload topology includes infrastructure elements and application configuration details;

deploy the application on a container environment based on the VM workload topology to produce a containerized application;

migrate, based on information in the manifest file and the application consumption attributes, persistent application data used by the application to the containerized application.

15. The computer system of claim 14, wherein the manifest file includes information for the application including topology, credentials, and configuration details.

16. The non-transitory machine readable storage medium of claim 12, wherein the first application consumption attributes or the second application consumption attributes comprise instantaneous application consumption attributes.

17. The non-transitory machine readable storage medium of claim 12, wherein the first application consumption attributes or the second application consumption attributes comprise historical application consumption attributes.

18. The non-transitory machine readable storage medium of claim 12, wherein the stateful data comprises persistent application data stored in an operating system volume.

19. The non-transitory machine readable storage medium of claim 12, wherein the stateful data comprises persistent application data stored in an external volume.

20. The non-transitory machine readable storage medium of claim 12, wherein said validating the functionality of the first and second containerized applications comprises validating the first and second containerized applications are running as intended.

* * * * *